T. J. Jones,
Piston Packing.
No. 52,644.                    Patented Feb. 13, 1866.
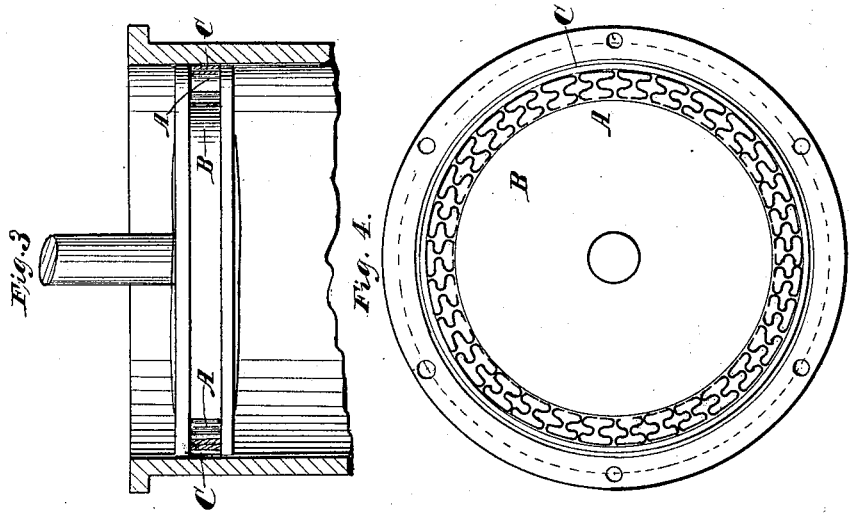
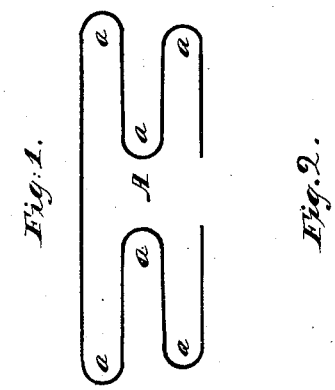

UNITED STATES PATENT OFFICE.

THOMAS J. JONES, OF SUMMIT, NEW JERSEY, ASSIGNOR TO DR. C. J. EAMES, OF NEW YORK, N. Y.

IMPROVEMENT IN PISTON-PACKING.

Specification forming part of Letters Patent No. 52,644, dated February 13, 1866.

*To all whom it may concern:*

Be it known that I, THOMAS J. JONES, of Summit, in the county of Union and State of New Jersey, have invented a new and Improved Self-Adjusting Spring for Piston-Packing; and I do hereby declare that the following is a full, clear, and exact description thereof, which will enable those skilled in the art to make and use the same, reference being had to the accompanying drawings, forming part of this specification, in which—

Figure 1 represents a transverse section of one of my springs. Fig. 2 is an inverted plan of the same. Fig. 3 is a sectional elevation of a piston packed with my springs. Fig. 4 is a plan of the same, the follower being removed to expose the spring-packing.

Similar letters of reference indicate corresponding parts.

The subject of this invention is a spring a series of which are used for packing pistons, and each of which is made of steel or other suitable material, in the form of a double M, connected at the front and open at the back, in such a manner that a spring is obtained which will adjust itself to the curve of any-sized cylinder, and thereby a perfect bearing throughout the entire length of the spring is insured.

A represents a spring, made of sheet-steel or any other suitable material, in the form of a double M, with round corners, as shown in Figs. 1 and 4; or, if desired, it might be made with sharp corners, though my present experience leads me to use, by preference, springs with round corners.

These springs are closed in front and open at the back, so that they are able to accommodate themselves readily to the curve of the piston in which they are to be used. They are placed between the body B of the piston and the ordinary split rings C, as shown in Figs. 3 and 4, and a perfect bearing is obtained throughout the entire length of each spring.

The springs are placed close together, as shown in Fig. 4, and consequently the split rings are kept in close contact with the inner surface of the cylinder throughout their entire circumference.

Each spring has six curves, $a$, of tension, and by their construction its elasticity is rendered superior to that of any spring known to me, and a piston-packing is obtained which is not liable to get out of order for a very long time, and which requires no attention on the part of the engineer after it has once been properly adjusted.

My spring is applicable to steam or water pistons of any size, and springs of the same size can be used for pistons of different sizes, said springs being able, as above remarked, to accommodate themselves readily to the curve of any-sized piston.

One advantage of my invention is that gradual curves are substituted for the acute angles frequently used in springs of analogous character. By this means the flexure of the metal is made more uniform and extended over a greater distance, instead of being restricted to particular points. I thus render the spring more durable and less liable to break.

What I claim as new, and desire to secure by Letters Patent, is—

As an improvement in springs for piston-packing, the double M-shaped spring closed in front and open at the back, in the manner herein specified and represented.

THOS. J. JONES.

Witnesses:
M. M. LIVINGSTON,
W. HAUFF.